(12) United States Patent
McPherson (10) Patent No.: US 11,440,369 B2
(45) Date of Patent: Sep. 13, 2022

(54) PICK AND CARRY CRANE SUSPENSION

(71) Applicant: TEREX AUSTRALIA PTY LTD, Eagle Farm (AU)

(72) Inventor: Clayton McPherson, Belmont (AU)

(73) Assignee: TEREX AUSTRALIA PTY LTD, Eagle Farm (AU)

( * ) Notice: Subject to any disclaimer, the term of this patent is extended or adjusted under 35 U.S.C. 154(b) by 0 days.

(21) Appl. No.: 17/286,229

(22) PCT Filed: Oct. 16, 2019

(86) PCT No.: PCT/AU2019/051119
§ 371 (c)(1),
(2) Date: Apr. 16, 2021

(87) PCT Pub. No.: WO2020/077399
PCT Pub. Date: Apr. 23, 2020

(65) Prior Publication Data
US 2021/0347222 A1    Nov. 11, 2021

(30) Foreign Application Priority Data

Oct. 16, 2018   (AU) .................................. 2018903904

(51) Int. Cl.
*B60G 17/08*    (2006.01)
*B60G 3/00*    (2006.01)
(Continued)

(52) U.S. Cl.
CPC .............. *B60G 17/08* (2013.01); *B60G 3/00* (2013.01); *B60G 5/005* (2013.01); *B60G 13/08* (2013.01);
(Continued)

(58) Field of Classification Search
CPC .............. B60G 2300/06; B60G 21/106; B60G 21/103; B60G 17/08; B60G 3/00;
(Continued)

(56) References Cited

U.S. PATENT DOCUMENTS 4,580,797 A * 4/1986 Ericsson ................ B62D 49/08
280/5.508
5,639,119 A * 6/1997 Plate ...................... B62D 49/08
280/754

(Continued)

FOREIGN PATENT DOCUMENTS

CN    108177494 A  *  6/2018
CN    208916737 U  *  5/2019
(Continued)

OTHER PUBLICATIONS

PCT Written Opinion of the International Searching Authority dated Dec. 5, 2019, Application No. PCT/AU2019/051119, Applicant Terex Auatralia Pty Ltd, 5 Pages.
(Continued)

*Primary Examiner* — Paul N Dickson
*Assistant Examiner* — Matthew D Lee
(74) *Attorney, Agent, or Firm* — Brooks Kushman P.C.

(57) ABSTRACT

A crane, in particular a pick and carry crane, may have a front chassis with front wheels and a back chassis with back wheels, the front chassis being articulated relative to the back chassis so that the crane can travel whilst carrying a load suspended from a boom. The back and front wheels have independent suspensions which are capable of connection to one another so that movement of a left wheel influences movement of a right wheel, thereby improving the handing of the crane, particularly over rough terrain.

21 Claims, 5 Drawing Sheets

(51) Int. Cl.
*B60G 5/00* (2006.01)
*B60G 13/08* (2006.01)
*B60G 17/019* (2006.01)
*B60G 21/10* (2006.01)
*B66C 23/36* (2006.01)
*B60G 17/005* (2006.01)
*B66C 23/42* (2006.01)

(52) U.S. Cl.
CPC ..... *B60G 17/01908* (2013.01); *B60G 21/103* (2013.01); *B60G 21/106* (2013.01); *B66C 23/36* (2013.01); *B60G 17/005* (2013.01); *B60G 2200/10* (2013.01); *B60G 2202/24* (2013.01); *B60G 2204/82* (2013.01); *B60G 2204/8304* (2013.01); *B60G 2300/06* (2013.01); *B60G 2400/0511* (2013.01); *B60G 2400/204* (2013.01); *B60G 2400/252* (2013.01); *B60G 2400/5182* (2013.01); *B60G 2400/972* (2013.01); *B60G 2500/30* (2013.01); *B60G 2800/012* (2013.01); *B60G 2800/019* (2013.01); *B66C 23/42* (2013.01); *B66C 2700/0378* (2013.01)

(58) Field of Classification Search
CPC .. B60G 5/005; B60G 13/08; B60G 17/01908; B60G 17/005; B60G 2200/10; B60G 2200/24; B60G 2204/82; B60G 2204/8304; B60G 2400/0511; B60G 2500/30; B60G 2800/012; B60G 2800/019; B66C 23/36; B66C 2700/0378
See application file for complete search history.

(56) References Cited

U.S. PATENT DOCUMENTS

| | | | |
|---|---|---|---|
| 2006/0192361 A1* | 8/2006 | Anderson | B60G 17/0195 |
| | | | 280/124.158 |
| 2013/0220110 A1 | 8/2013 | Zhan et al. | |
| 2020/0140249 A1* | 5/2020 | Hackenberg | B60G 17/005 |
| 2020/0317486 A1* | 10/2020 | Puszkiewicz | B66F 17/006 |

FOREIGN PATENT DOCUMENTS

| | | | | |
|---|---|---|---|---|
| JP | 2723416 B2 | * | 3/1998 | |
| JP | 11091332 A | * | 4/1999 | |
| JP | 2021014345 A | * | 2/2021 | |
| WO | 89/00928 A1 | | 2/1989 | |
| WO | WO-8900928 A1 | * | 2/1989 | ........... B60G 17/033 |
| WO | 2018/049475 A1 | | 3/2018 | |
| WO | WO-2018049475 A1 | * | 3/2018 | ........... B62D 61/125 |

OTHER PUBLICATIONS

PCT International Search Report dated Dec. 5, 2019, Application No. PCT/AU2019/051119, Applicant Terex Auatralia Pty Ltd, 4 Pages.

* cited by examiner

PICK AND CARRY CRANE SUSPENSION

CROSS-REFERENCE TO RELATED APPLICATIONS

This application is the U.S. national phase of PCT Application No. PCT/AU 2019/051119 filed on Oct. 16, 2019, which claims priority to Australian Patent Application No. AU 2018903904 filed on Oct. 16, 2018, the disclosures of which are incorporated in their entireties by reference herein.

TECHNICAL FIELD

This disclosure generally relates to pick and carry cranes and, more particularly, to articulated pick and carry cranes with improved suspension systems.

BACKGROUND

A pick and carry crane is a type of crane that is able to move (i.e. travel) while it has a load suspended from a boom of the crane. Some pick and carry cranes are able to drive on public roads at highway speeds, with these cranes being classified as special purpose vehicles. The design of pick and carry cranes can vary depending on the application of the crane. Some designs of pick and carry cranes are more maneuverable compared to other crane types. For example, when the pick and carry crane is articulated, the whole crane can fit within a turning circle of the crane. This design feature can enable articulated pick and carry cranes to be used in tight or confined spaces to lift and move loads, such as on the floor of a manufacturing facility.

Pick and carry cranes can also take the form of "taxi cranes", which is a reference to the crane travelling with all equipment required to operate through the full range of capability of the crane. In some taxi cranes, the same operator station is used to control the crane when travelling (such as on a public road) as when operating the crane at a facility. This "single cabin" arrangement helps to simplify crane configuration, and also provides flexibility for the operator (i.e. by not having to move back and forth between a driver's cab and a crane cab). Many cranes cannot operate as a taxi crane since they cannot transport all components required to operate, hence support vehicles are generally required to carry extra components, such as counterweights and rigging including slings & hooks.

As the maximum rated capacity (MRC) of the crane increases, its weight generally increases. Pick and carry cranes tend to carry lighter loads in comparison to other cranes (i.e. less than 25 tonnes). However, the increased maneuverability of pick and carry cranes has led to a demand for pick and carry cranes that are able to carry more than or that have an MRC greater than 25 tonnes, whilst also being able to lift and carry such larger loads in confined or tight spaces.

However, as the rated capacity of a pick and carry crane increases, its maneuverability decreases and the susceptibility to sideways tipping generally also increases. It is desirable for such cranes to operate on different terrains often while carry a load and still provide a reasonable degree of ride comfort, particularly when travelling on public roads at speed.

It is to be understood that references herein to the prior art do not constitute an admission that such art forms a part of the common general knowledge of a person of ordinary skill in the art, in Australia or any other country.

SUMMARY

An embodiment of the disclosure extends to a pick and carry crane comprising a front chassis being connected to at least two front wheels by a front suspension system and a back chassis being connected to at least two back wheels by a back suspension system, wherein the front chassis is connected to the back chassis to allow articulation between the front and rear chassis, wherein the front hydraulic suspension system includes hydraulic dampers acting between respective front wheels and the front chassis;

the rear hydraulic suspension system includes hydraulic dampers acting between respective rear wheels and the rear chassis; and wherein the pick and carry crane further comprises at least one controller for selectively connecting the dampers of the front wheels to one another or the dampers of the rear wheels to one another.

Such an arrangement may be built at lower cost than a traditional mechanical anti-rollbar type suspension. Furthermore, this arrangement may provide additional suspension travel compared to the mechanical system.

In an embodiment, the dampers on a left-side of the pick and carry crane are connected to the dampers of a right-side of the pick and carry crane.

Alternatively, or in addition, the dampers of the left side are connected to one another and/or the dampers of the right side are connected to one another.

The dampers may comprise hydraulic cylinders having a shaft chamber and a piston chamber. The cylinders may be connected in one or more of the following arrangements:

The piston chamber of a first cylinder to the shaft chamber of a second cylinder where the second cylinder is on an opposite side of the crane to the first cylinder.

The shaft chambers of a side of the crane may be connected to one another. The piston chambers of a side of the crane may be connected to one another. This may be for rear axles only.

The front axle may be locked against the front chassis by pressurising the shaft chambers of all front suspension cylinders.

Preferably, dampers on opposing sides are connected to one another during a travel mode when high lateral loading is present and is selectively turned off during site travel where uneven terrain may be encountered or during lifting work when additional suspension travel may be advantageous.

In addition, embodiments may provide additional safety to a crane operator and surrounding personnel compared to the system which is not selectively controllable.

Embodiments may provide a pick and carry crane with great operational scope on uneven terrain, allowing the crane to access areas which were previously inaccessible to cranes which did not utilise this suspension system and therefore had comparably less available traction to drive the wheels.

In an embodiment, a hydraulic manifold for the suspension is combined with a hydraulic manifold for the crane steering. This significantly reduces the cost of the manufacturing process and reduces the time for the manufacturing process by reducing the number of parts to install.

Although embodiments have been described utilising wheels, it is to be realised that further embodiments extend to other forms of engagement with the travelling surface such as tracks or any other means of travelling engagement requiring the use of suspension which could be used with a pick and carry crane. Wheels for the crane may each comprise rubber or rubber composite tyres.

Embodiments extend to pick and carry cranes having a single front axle and a single back axle or pick and carry cranes having a single front axle and a double back axle, among others. Where the pick and carry crane has two back axles, the controller may be arranged to selectively connect the dampers of one axle to one another. In this case, left wheels of a foremost rear axle will be connected to right wheels of the foremost rear axle and left wheels of a rearmost rear axle will be connected to right wheels of the rearmost rear axle. In an alternative embodiment, the dampers of all of the rear axles are selectively connected to one another.

The controller may be adapted to control each damper individually.

The controller may be adapted to alter a height of the front and/or rear chassis relative to a respective wheel by controlling the dampers.

The controller may be adapted to control the dampers to alternate between two or more of the following modes:
all dampers fully extended;
(ii) all dampers fully retracted;
(iii) all dampers acting independently; and
(iv) the dampers of the front wheels being connected to one another and the dampers of the rear wheels of an axle being connected to one another.

The pick and carry crane may further comprise one or more incline sensors for measuring an incline of one or both of the front and rear chassis, wherein the controller is adapted to alter a height of the front and/or rear chassis relative to a respective wheel in dependence on a measured incline.

The front wheels of the pick and carry crane may be connected by a front axle and the back wheels may be connected by a back axle, and the pick and carry crane may further comprise a third axle located rearward of the back axle, the third axle carrying a second set of rear wheels.

The third axle may be moveable between a crane mode position where the second set of rear wheels engage a travelling surface and a travel mode position where the second set of rear wheels are lifted away from the travelling surface.

The controller may be switchable between a travel mode and a crane mode, and when in the travel mode, the controller may engages the mode wherein the dampers of the front wheels are connected to one another and the dampers of the rear wheels of an axle are connected to one another, and in the crane mode, the controller may engages the mode where all dampers act independently.

The controller may be adapted to be switchable to a further tandem mode wherein the third axle is moved to the crane mode and the dampers of all rear wheels of one side of the crane are connected to one another and the dampers of all rear wheel of another side of the crane are connected to one another.

The dampers may be cylinders, each cylinder comprising a piston chamber and a shaft chamber.

Connecting any two dampers may comprise connecting the piston chamber of a first cylinder to the shaft chamber of a second cylinder.

A further embodiment extends to a method of controlling a suspension for a pick and carry crane, the pick and carry crane comprising a front chassis being connected to at least two front wheels by a front hydraulic suspension system and a back chassis being connected to at least two back wheels by a back hydraulic suspension system, wherein the front chassis is connected to the back chassis to allow articulation between the front and rear chassis, wherein
the front hydraulic suspension system includes hydraulic dampers acting between respective front wheels and the front chassis;
the rear hydraulic suspension system includes hydraulic dampers acting between respective rear wheels and the rear chassis; and wherein the method comprises
connecting the dampers of the front wheels to one another or the dampers of the rear wheels to one another.

The method may further comprise connecting the dampers of the front wheels to one another and the dampers of the rear wheels to one another.

The method may further comprise the step of controlling each damper individually.

The method may further comprise the step of altering a height of the front and/or rear chassis relative to a respective wheel by controlling the dampers.

The method may further comprise the step of alternating between two or more of the following modes:
(i) all dampers fully extended;
(ii) all dampers fully retracted;
(iii) all dampers acting independently; and
(iv) the dampers of the front wheels being connected to one another and the dampers of the rear wheels of an axle being connected to one another.

The crane may further comprise one or more incline sensors for measuring an incline of one or both of the front and rear chassis, wherein the method may further comprise the step of altering a height of the front and/or rear chassis relative to a respective wheel in dependence on a measured incline.

The front wheels may be connected by a front axle and the back wheels may be connected by a back axle, the crane may further comprise a third axle located rearward of the back axle, the third axle carrying a second set of rear wheels.

The third axle may be moveable between a travel mode position where the second set of rear wheels engage a travelling surface and a crane mode position where the second set of rear wheels are lifted away from the travelling surface. This can help to maintain the maneuverability of the crane (e.g. when in crane mode).

In a further embodiment of the crane, each of the rear axles may be able to be displaced. Thus, when operating in a crane mode, an optimum axle to be displaced can be selected by the operator or may be automatically selected by a programmable controller.

The method may further comprise the step of switching between a travel mode and a crane mode, wherein in the travel mode, the dampers of the front wheels are connected to one another and the dampers of the rear wheels of an axle are connected to one another, and in the crane mode, all dampers act independently.

In an embodiment, the crane may be adapted to operate in a travel mode in which the wheels of the first rear axle selectively engage the ground, and a crane mode in which the wheels of the first rear axle selectively disengage the ground. When in travel mode, the crane may have a ground speed of 60, 70, 80, 90, 100 or 110 km/h.

In an embodiment, the crane may be adapted to change from the crane mode to the travel mode at a predetermined ground speed of the crane. The change from the crane mode to the travel mode may occur automatically (i.e. the disengaged axle may be automatically lowered). The predetermined ground speed of the crane at which the change occurs may be less than around 10 km/h and may occur at around 5 km/h.

The method may further comprise the step of switching to a tandem mode wherein the third axle is lowered during crane mode and the dampers of all rear wheels of one side of the crane are connected to one another and the dampers of all rear wheels of another side of the crane are connected to one another.

The dampers may be cylinders, each cylinder comprising a piston chamber and a shaft chamber.

Connecting any two dampers during crane mode may comprise connecting the piston chamber of a first cylinder to the shaft chamber of a second cylinder. In further modes, such as tandem mode, the shaft chambers of the left sides of the rear axles are connected to one another and the piston chambers of the left sides of the rear axles are connected to one another. Similarly, the shaft chambers of the right side are connected to one another, as are the piston chambers of the right side. In tandem mode, the front axle is locked against the chassis by pressurising the shaft chambers of all front suspension cylinders.

A further embodiment extends to a crane comprising a front chassis being connected to at least two front wheels by a front hydraulic suspension system and a back chassis being connected to at least two back wheels by a back hydraulic suspension system, wherein
  the front hydraulic suspension system includes hydraulic dampers acting between respective front wheels and the front chassis;
  the rear hydraulic suspension system includes hydraulic dampers acting between respective rear wheels and the rear chassis; and wherein
  the pick and carry crane further comprises at least one controller for selectively connecting the dampers of the front wheels to one another or the dampers of the rear wheels to one another.

The front chassis may be connected to the back chassis to allow articulation between the front and rear chassis.

The crane may be a pick and carry crane.

Mobile cranes are generally rated according to their Maximum Rated Capacity (MRC). For example, in Australia it is a requirement that the MRC be displayed on the crane. The MRC is the highest rated capacity (RC) value that a crane can lift. In most cases there will be a very limited range of configurations in which the MRC will be achieved, and a lesser RC will exist for all other configurations. Hence a crane referred to as a "20 tonne" crane has a MRC of 20 tonne.

However the RC of a crane is based on a combination of the stability load moment capacity of the crane as well as the strength limit of all components of the crane. For example, two pick and carry cranes may have a 25 MRC, where a first crane can lift 25 tonne at a 1.0 metre radius, and the second crane can lift 25 tonne at a 1.4 metre radius. The two cranes have the same MRC but the second crane has a higher load moment capacity. Hence, at any other radius, such as say 3.0 metre, the second crane has a much higher RC because of its higher load moment capacity.

Therefore, in practice it is load moment capacity that denotes the usefulness of a crane. The stability load moment capacity of a crane is derived from two variables; the total mass (referred to generally as the weight) of the crane and the distance from the centre of gravity (CG) of the crane mass to the tipping line, where:

Load Moment=(crane mass)×(radius of CG to tipping line).

For example, if a crane has load moment capacity of 30 tonne metre, then at a radius of 3 metres, it will safely lift 10 tonne, and at radius of 5 m it will safely lift 6 tonne, assuming no component limitations.

A pick and carry crane using the first counterweight as disclosed herein may have a MRC and load moment capacity that can exceed existing pick and carry cranes (i.e. that do not employ such a first counterweight). In an embodiment, the MRC of the pick and carry crane as disclosed herein may be greater than 15 tonne, preferably greater than 22 tonne, further preferably greater than 25 tonne, further preferably equal to or greater than 40 tonne (t). In an embodiment, the load moment of the pick and carry crane as disclosed herein may be 66 tonne meters (t.m). However, these values are indicative, and should not be interpreted as representing upper limits.

The pick and carry crane as disclosed herein may be configured to have a MRC of at least 30, 35, 40, 45 or 50 tonne.

Also disclosed herein is a pick and carry crane that is operated according to the methods as set forth above.

BRIEF DESCRIPTION OF THE DRAWINGS

Non-limiting embodiments will now be described, by way of example only, with reference to the accompanying drawings, in which.

DETAILED DESCRIPTION

Figure 1:
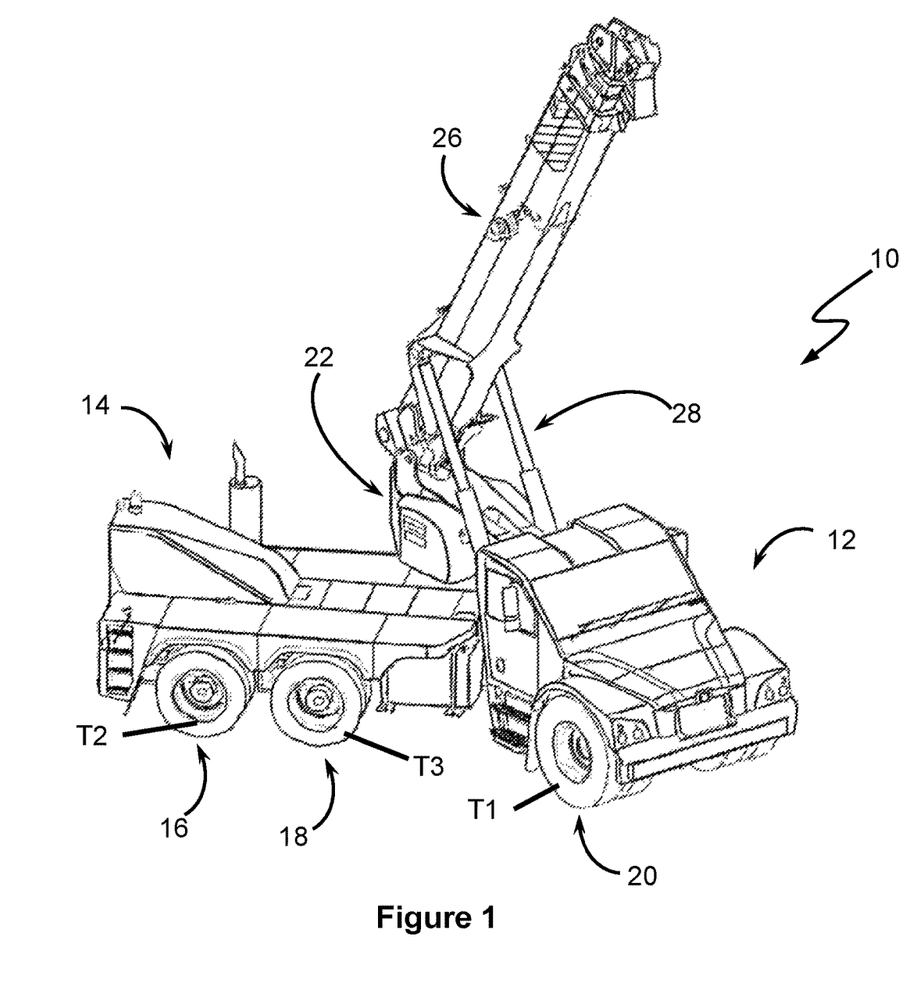
FIG. 1 shows a perspective view of an embodiment of a pick and carry crane of FIG. 1.
Figure 2A:
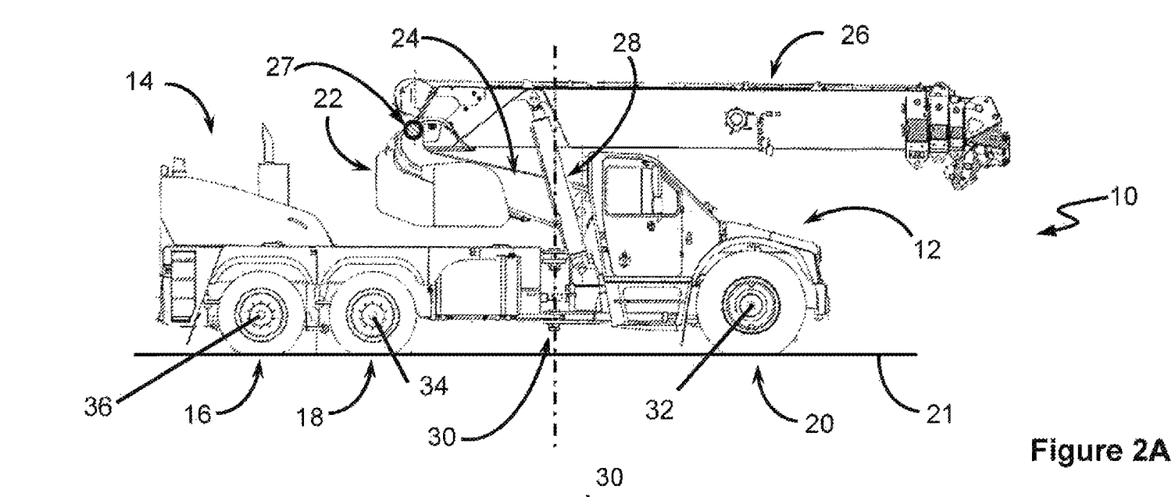
FIGS. 2a and 2b show side views of the pick and carry crane of FIG. 1.
Figure 2B:
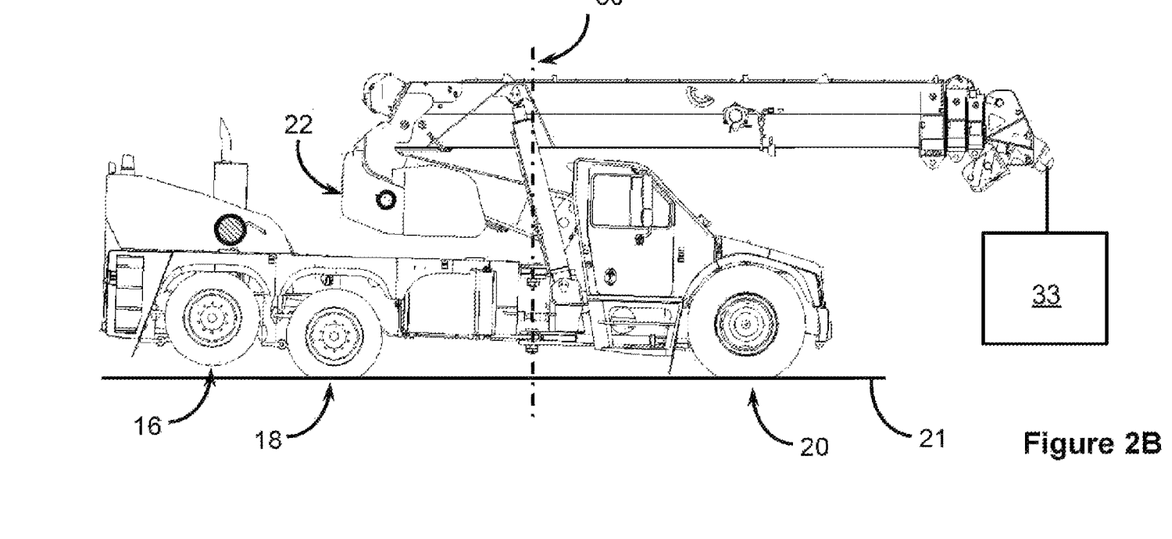
Figure 3:
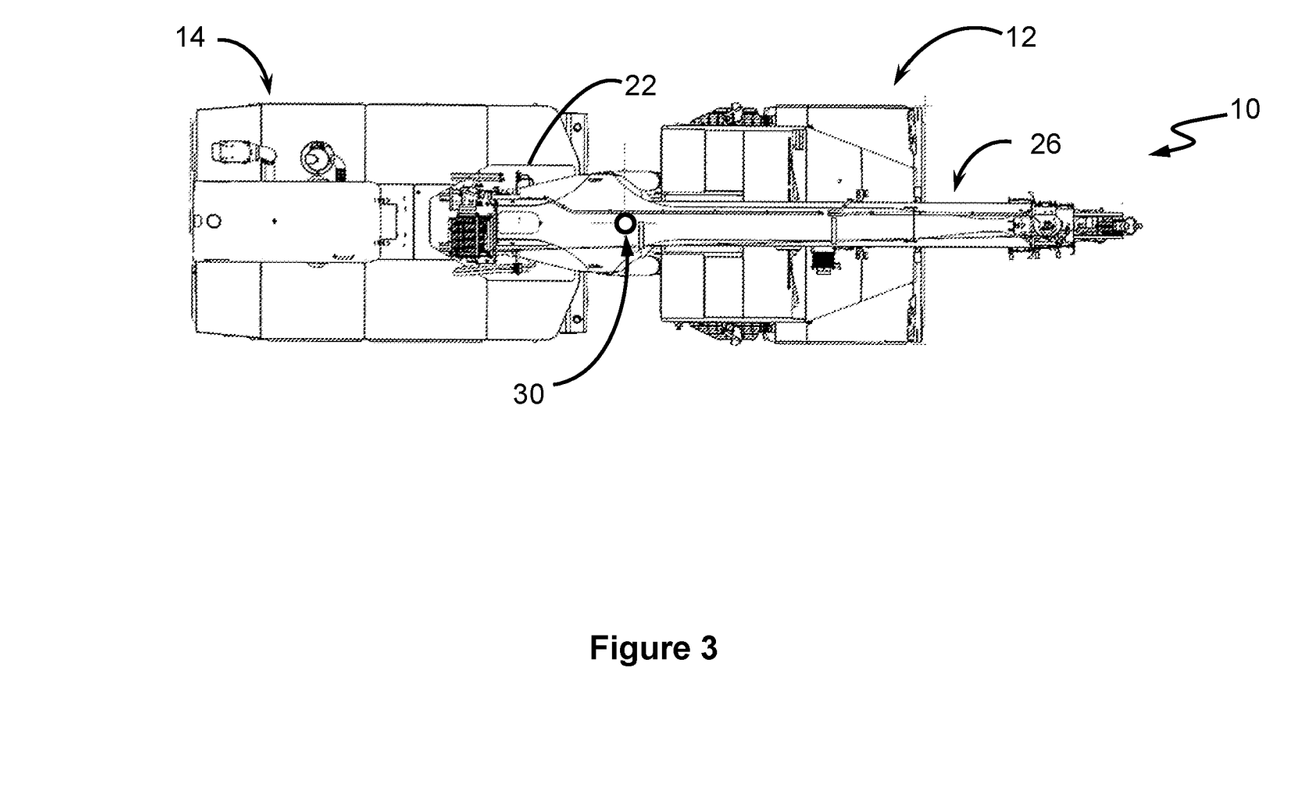
FIG. 3 shows a plan view of the pick and carry crane of FIG. 1.

FIGS. 1, 2 and 3 show a pick and carry crane 10. The crane 10 has a front body 12 which is the front part of the crane 10 and which includes a front chassis 13 (see FIG. 2). The front body 12 is pivotally connected via a pivot arrangement 30 (exemplified by the dashed line in FIGS. 2 and 3) to a rear body 14 of the crane 10. The rear body 14 comprises a rear chassis 15 (see FIG. 2). The pivot point 30 may be provided with moveable linkages, such as hydraulic rams, to control the pivot angle of the front body 12 to the rear body 14. Adjusting the pivot angle using the moveable linkages helps to turn the crane 10.

The crane 10 is provided with a first counterweight 22 mounted with respect to the crane 10. The counterweight 22 is arranged to move to maintain a counteracting side tipping moment above a threshold value when the crane is lifting and/or carrying a load.

Attached to the rear end of the front body 12 is a boom support arm 24. The boom support 24 may be a separate structure that is mounted e.g. welded or bolted to the front body 12. In an embodiment, the boom support arm 24 forms part of the front chassis 13 of the front body 12. The boom support arm 24 pivotally supports boom 26, where the boom 26 is raised and lowered about the pivot point, represented by pin 27 (FIG. 2), using linear actuators in the form of hydraulic rams 28. The boom 26 may have a fixed length or may be telescopic. Other forms of linear actuators can be used in place of or in addition to rams 28. In FIGS. 1 to 3, the counterweight 22 is mounted to an opposite end of the boom support arm 24 so that counterweight 22 is located rearwardly of the pivot arrangement 30.

The crane comprises a front axle 32 and two rear axles 34 and 36. Generally, by providing a crane 10 that has more than a single rear axle allows the crane to lift and carry larger loads compared to a conventional two axle pick and carry crane. In the crane 10 of FIGS. 1 to 5, the front body 12 has front axle 32 for supporting the front chassis 13 on the ground via tyres T1 of front wheels 20. The rear body 14 has foremost axle 34 and rearmost axle 36, each for supporting the rear chassis 15 on the ground, via rear tyres T2 of wheels 16 and rear tyres T3 of wheel 18, respectively. The arrangements of the tyres and respective wheels are explained further with reference to FIG. 4). The rearmost rear axle 36 is arranged to be displaced relative to the foremost rear axle 34 such that the tyres of wheels 16 can be selectively engaged (FIG. 2A) or disengaged (FIG. 2B) with the ground 21.

In a variation, the second rear axle can be arranged to be displaced relative to the first rear axle such that the tyre of wheel 18 can be selectively engaged or disengaged with the ground 21.

The overall length of crane 10 from the rear end of the rear body 14 to the tip of the boom 26 in a retracted state, e.g. FIG. 2, can be 11700 mm. The length from the rear end of the rear body 14 to the front end of the front body 12 can be 8430 mm. The crane 10 can have a height from the road 21 to the top of boom 26 of 3470 mm. While the term "road" has been used, the term road can include any surface on which crane 10 is driven in either crane or travel modes. For example, "road" may include asphalt, gravel, concrete and compacted dirt, and may be "off-road".

As shown in FIG. 2B, the distance from the pivot point 30 to the front wheel 20 and the distance from the pivot point to wheel 18 is the same. This can help to ensure that the rear body 14 follows the front body 12 when the front body moves through a tight space when cornering e.g. through a gap just wide enough for the crane 10. However, in some embodiments, distance from the pivot point 30 to the front wheel 20 and the distance from the pivot point to wheel 18 is not the same. When the tyre of wheel 16 is engaged with the ground 21 (as shown in FIG. 2A), the wheelbase length increases.

By having the wheels closest to the rear of the rear body 14, i.e. wheel 16, move between an engaged and disengaged state with road 21, the rear wheels that are closest to the pivot point 30, i.e. the tyres of wheels 18, are always in contact with the ground. Because the tyres of wheels 18 are always in contact with the ground, the wheelbase length of the crane 10 decreases when the tyres of wheels 16 are lifted off the ground. This can help to decrease the radius of turning and improve the turning circle. In some embodiments, the turning circle of crane 10 is similar to a standard pick and carry crane that only has two axles and a lower load moment capacity.

Having more than two axles can help to spread the forces exerted onto the crane more evenly onto road 21. By providing more than two axles, the crane 10 is able to comply with road regulations. For example, in Australia, the maximum load that each axle can carry for special purpose vehicles is limited to 12 tonnes. Therefore, the weight of the crane is limited to 24 tonne for a two axle crane. By having three axles, the weight of the crane can be up to 36 tonne whilst still complying with road regulations. This can allow crane 10 to drive on sealed roads so as to travel between sites of operation e.g. a manufacturing floor or building site.

However, at sites of operation, regulated axle load limits do not always need to be met, since the surface on which the crane 10 operates may be rated for more than 12 tonne of load per axle. For example thick concrete slabs can handle axle loads far greater than 12 tonne per axle. Since only two axles may be needed in operation, i.e. when the crane 10 is operating in crane mode, the tyres of rear wheel 16 can be lifted off the road 21 to improve the turning circle of crane 10. In this way, the crane 10 is configured to operate in a travel mode when the tyres of wheel 16 are selectively engaged with the road/ground, and a crane mode when the tyres of wheel 16 are selectively disengaged the road/ground.

The weight limit of a tyre for a pick and carry crane can also be determined by the rotational speed of the tyre. Therefore, if the crane 10 operates at a speed above a level that is suitable for a particular tyre, the tyre can be damaged and can rupture.

Therefore, crane 10 may be configured to change between having one rear axle raised and having both rear axles engaged with the road, once the ground speed of the crane has reached a predetermined ground speed of the crane. The predetermined ground speed may be 1, 2, 3, 4, 5, 6, 7, 8, 9 or 10+ km/h. Specifically, the predetermined ground speed may be around 5 km/h.

In circumstances when the crane 10 is carrying a load and is operating in crane mode, if the ground speed of the crane increases above the predetermined speed, the crane 10 may lower rear wheel 16 and convert into tandem mode, even though the crane 10 is still carrying a load. Once the ground speed drops below the predetermined speed the rear tyre of wheel 16 can be lifted to convert the crane 10 back into crane mode. Converting crane 10 from two axle mode to three axle mode, even when lifting and/or carrying a load, will sacrifice maneuverability, but can help to reduce the damage and wear, and thereby improve the lifespan, of the tyres of wheels 16, 18 and 20. In an embodiment, when in travel mode, crane 10 can drive at highway speeds, for example 80 km/h or higher.

Conversion between travel mode and crane mode may be performed manually or automatically. Manual conversion may involve an operator instructing the crane 10 to engage the tyres of wheel 16 with the road 21. The operator may be instructed by a signal from a controller (see FIG. 5). Automatic conversion may help to reduce operator error. It may also allow a crane operator to simply drive from site to site without having to worry whether or not the tyres of wheel 16 need to be engaged or disengaged with road 21.

Figure 4:
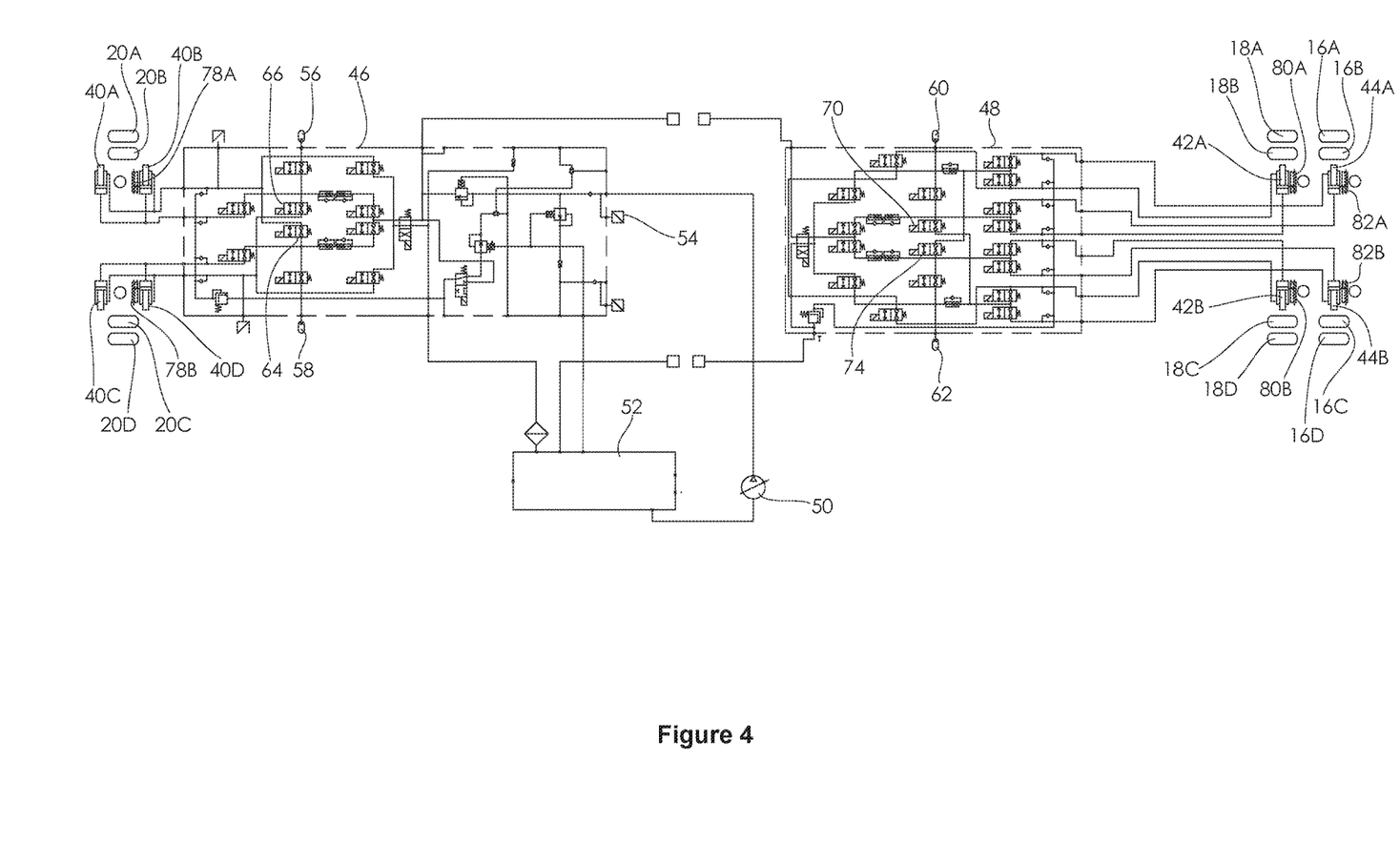
FIG. 4 shows the connections of the hydraulic manifolds of the pick and carry crane of FIG. 1.

The suspension is described in further detail with reference to FIG. 4. There are four front wheels 20 A, 20 B, 20 C and 20 D, all connected to front axle 32. In these embodiments, the left-side and right-side of the crane 10 are designated with respect to the direction of travel. Therefore, front wheels 20 A and 20 B of the right-side wheels and 20 C and 20 D are the left-side wheels. In this embodiment, the front suspension comprises four cylinders 40 A and 40 B (on the right-side) and 40 C and 40 D (on the left-side).

The pick and carry crane 10 further comprises rear wheels 18 A, 18 B, 18 C and 18 D connected to rear axle 34 and rear wheels 16 A, 16 B, 16 C and 16 D connected to rear axle 36. Cylinder 42 A controls the suspension for rear wheels 18 A and 18 B; cylinder 42 B controls the suspension for rear wheels 18 C and 18 D; cylinder 44 A controls suspension for rear wheels 16 A and 16 B; and cylinder 44 B controls the suspension for rear wheels 16 C and 16 D.

In this embodiment, the front suspension is controlled through the front manifold 46 and the rear suspension is controlled through the rear manifold 48. A pump 50 supplies pressure to both the rear manifold 48 and the front manifold 46 by drawing oil from tank 52. A pressure sensor 54 monitors the pressure supplied by the pump 50 within the system. Accumulators 56 and 58 provide resilience for the cylinders 40 A to 40 D. Similarly, for the rear manifold 48 resilience is provided by the accumulators 60 and 62.

A valve 64 is provided to conditionally allow connection between the piston chambers of cylinders 40 C and 40 D and the shaft chambers of cylinders 40 A and 40 B. In this manner, a connection is established between the left-side dampers and the right-side dampers of the front suspension. This cross-linking establishes a feedback providing an anti-roll effect allowing the crane to corner at higher speeds than would otherwise be possible. Furthermore, this provides improved ride comfort at higher speeds, particularly those speeds at which the crane may travel on public roads.

With reference to the rear suspension, valve 70 is provided to conditionally allow connection between the piston chambers of cylinders 42 A and 44 A and the shaft chambers of cylinders 42 B and 44 B. Similarly, valve 74 allows conditional connection between the shaft chambers of cylinders 42 A and 44 A and the piston chambers of cylinders 42 B and 44 B.

The crane 10 further comprises length sensors to determine the extension of the suspension. In this embodiment, for the front suspension, length sensor 78 A is associated with cylinder 40 B on the right-side and length sensor 78 B is associated with cylinder 40 D on the left-side. Since the extension of cylinder 40 B will be the same as the extension of the other cylinder on the right-side, cylinder 40 A, no length sensor is required for association with cylinder 40 A. For similar reasons, no length sensor is required for association with cylinder 40 C.

Cylinders 42 A, 42 B, 44A and 44 B each have respective length sensors 80A, 80 B, 82 A and 82 B associated therewith.

Pressure sensors 84 and 86 monitor the pressure within the hydraulic line they are connected to; typically shaft chambers for a pair of front cylinders, however also piston chambers for the opposite side during crosslinked (travel) mode, as the hydraulic line is common during this mode.

Figure 5:
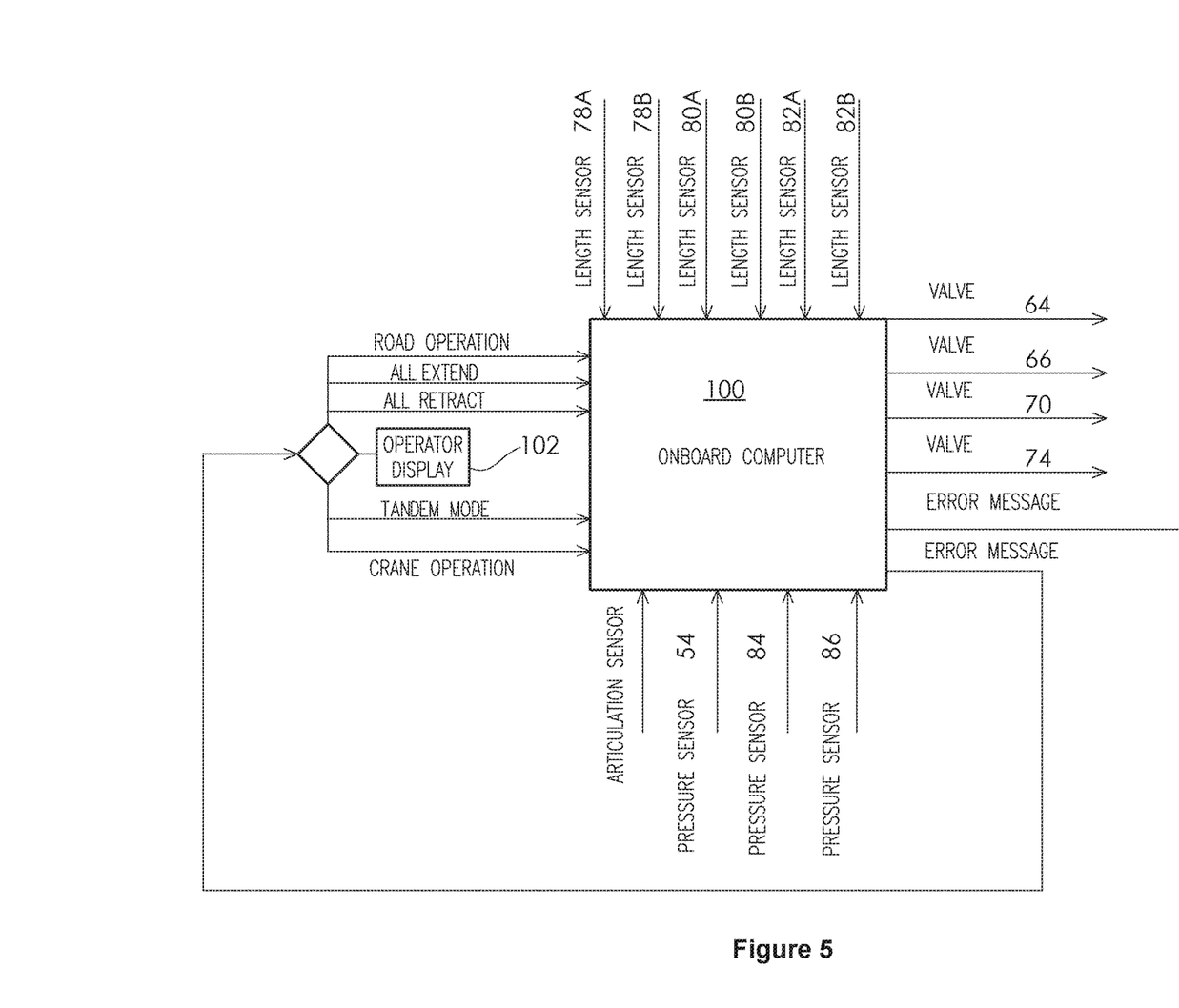
FIG. 5 shows the connections of the controller of the pick and carry crane of FIG. 1.

FIG. 5 illustrates electronic connections of certain components of the crane 10. A central computer 100 acts as a controller and implements software which is able to perform the functions described herein. It is to be realised that a single computer has been illustrated, but in embodiments, the functions may be distributed over a number of decentralised processors.

The computer 100 is connected to the valves 64, 66, 70 and 74, and controls their operation. The computer 100 receives signals from the pressure sensors 54, 84 and 86, and from the length sensors 78A, 78B, 80A, 80B, 82A and 82B.

The crane 10 further comprises an operator display and user interface 102 which displays information to an operator of the crane 10 and accepts user input from the operator.

In this embodiment, the operator is able to select between the following modes of operation with the following characteristics:

i. Travel Mode

In this mode dampers on the left side of the crane 10 are connected to dampers on the right side of the crane 10, in the manner described above. Specifically, cylinders associated with the left side of an axle are connected to the cylinders of the right side of that axle. Shaft chambers are connected to piston chambers to provide an anti-roll effect.

In an embodiment, the cross-linking of the cylinders is automatically engaged when the crane is in travel mode and the speed of the crane exceeds a predetermined limit, for example 5 km/h.

ii. Crane Mode

In the crane mode, the cylinders 40 A, 40 B, 40 C and 40 D of the front suspension act independently on the left and right sides of the crane. Similarly, cylinders 40 to A and 42 B controlling the suspension of rear axle 34 will act independently of one another. In this mode, the third axle, rear axle 36, is raised by having the corresponding cylinders 44 A and 44 B fully retract.

iii. Tandem Mode

Tandem mode is similar to crane mode, but in this mode the third axle is lowered by allowing cylinders 44 A and 44 B to act in tandem with cylinders 42A and 42B, respectively.

This mode is useful when the crane is operating on terrain which is soft or infirm.

iv. All Extend Mode

In this mode, all of the cylinders of both the front and rear suspensions are extended so that the crane has a maximum clearance above the ground. This may be required under certain operating conditions, e.g. to clear obstructions on the ground or when being placed on the back of a truck for delivery to a customer.

v. All Retract Mode

In this mode, all of the cylinders of both the front and rear suspensions are retracted so that the crane has a minimum clearance above the ground. This may be required under certain operating conditions, e.g. once placed on the back of a truck for delivery to a customer.

Conditions that may require changes to the suspension configuration can arise from a number of different crane components. Also, when in crane mode (e.g. FIG. 2B), or in other modes, there are many conditions that can limit or over-ride changes to suspension configuration, or on other occasions actually trigger a suspension system change (e.g. going over the predetermined ground speed). Therefore, the suspension system in crane 10 may be fitted with one or more sensors in addition to the sensors mentioned above to monitor, for example, axle load, individual wheel load, axle height position, and wheel rotation speed. The computer 100 may control the suspension the one or more sensors before making suspension system changes. The changes may be automatic, or they may alert a crane operator that the suspension system needs adjusting.

An articulation sensor is illustrated as an input to computer 100 in FIG. 5, and changes to the suspension may be made in reaction to the measured angle of articulation. For example, travel mode may be disabled if the angle of articulation exceeds a certain value.

Further modes of operation may also be employed. For example, wheels on one side of the crane 10 may be raised relative to the wheels on the other side. This may help crane 10 to adjust to uneven and sloping ground, and may help to stabilise the crane 10 when travelling across an inclined surface when either in crane mode or travel mode. For example, if crane 10 is travelling across an incline that slopes down to the right, the ride height of the wheels on the right may be increased to level the crane. This may be useful in stabilising the crane when operating in crane mode since the load being carried will tend to exert a sideways tipping moment on the crane.

Having first and second rear axles, each for supporting the rear body on the ground, via first rear tyre of wheel 16 and second rear tyre of wheel 18, respectively, can also allow crane 10 to slew around one wheel. Slewing is the angular movement of a crane boom or crane jib in a horizontal plane. With traditional two axle pick and carry cranes, a holding brake can be applied to one of the wheels and then three of the wheels are free to rotate in either direction. Therefore, during slewing, the free wheels are able to rotate throughout the change in articulation, with the pivot point of slewing being provided by the wheel to which the holding brake has been applied. When one of the crane bodies, e.g. the rear crane body 14, has two or more axles with tyres in contact with the ground, the slewing ability of the crane is diminished or lost. For example, during any slewing movement, one or the two axles would be dragged sideways during the operation. This can lead to very poor tyre wear, and may also lead to vibration and a jerking movement of the crane during load carrying, which will affect crane usability and also safety, as it can also induce load swing. Therefore, by having rear tyres of wheels 16 moveable between engaged and disengaged states, the slewing ability of crane 10 may be similar to conventional two axle pick and carry cranes when operating in crane mode.

Since crane 10 is able to lift and carry greater loads compared to traditional pick and carry cranes, the loads placed onto the front axle and front tyres 20 tend to increase.

In crane mode, the loads being transferred through the front axle and tyre 20 are generally greater than those of the rear axles and tyres of wheels 16 and 18 when carrying load 33. To accommodate this increase in load, the front axle may have a reactive suspension system. The front axle suspension system can be arranged to allow for a frame of the front body 12 to rest on and transfer load directly to the front axle during a crane mode. Therefore, the high forces can be transferred directly from the frame to the axle without stress to the suspension system (i.e. forces of up to about 56,000 kg).

In an embodiment, the front suspension uses fixed stops on the chassis which, together with the cylinders 40 A to 40 D, allow the frame of the front body 12 to drop and rest on the front axle. In an alternative embodiment, to maintain the ride height of the crane, supporting members may extend from the frame of the front body 14 and engage with the front axle so as to take the load off the suspension system and transfer weights and loads directly onto the front axle. This may be useful when the crane is operating on uneven ground and a high ground clearance is required. Given the loads passed through the front axle and tyres of wheels 20 are greater than those passed through rear tyres of wheels 16 and 18, the front tyres of wheels 20 may be configured to handle the increased loads. In the Figures, the front tyre of wheel 20 has a larger diameter when compared to rear tyres of wheels 16 and 18. However, in some embodiments, the tyre diameters may be the same, although the front tyre of wheel 20 would still be configured to accommodate the increased loads when lifting and carrying a load.

While the embodiments shown in the Figures describe an articulated pick and carrying crane having rubber tyres, the principles of the disclosure may be extended to other forms of pick and carry cranes, for example pick and carry cranes having crawler tracks.

In the claims which follow and in the preceding description of the pick and carry crane, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the disclosure.

The invention claimed is:

1. A pick and carry crane comprising a front chassis connected to at least two front wheels by a front suspension system and a rear chassis connected to at least two rear wheels by a rear suspension system, wherein the front chassis is connected to the rear chassis to allow articulation between the front chassis and the rear chassis, wherein
   the front suspension system includes hydraulic dampers configured to act between respective front wheels and the front chassis;
   the rear suspension system includes hydraulic dampers configured to act between respective rear wheels and the rear chassis; and wherein
   the pick and carry crane further comprises at least one controller for selectively connecting the dampers of the front suspension system to one another and the dampers of the rear suspension system to one another;
   wherein the at least two front wheels comprise two front wheels that are connected by a front axle and the at least two rear wheels comprise a first set of rear wheels, which are connected by a rear axle, and a second set of rear wheels, and wherein the crane further comprises a third axle located rearward of the rear axle, the third axle carrying the second set of rear wheels;
   wherein the third axle is moveable between a crane mode position where the second set of rear wheels is engageable with a travelling surface and a travel mode position where the second set of rear wheels is lifted away from the travelling surface;
   wherein the at least one controller is adapted to control the dampers to alternate between two or more of the following modes:
   (i) all dampers fully extended;
   (ii) all dampers fully retracted;
   (iii) all dampers acting independently; and
   (iv) the dampers of the front suspension system being connected to one another and the dampers of the rear suspension system for rear wheels of the first and second sets of rear wheels on one side of the crane being connected to both of the dampers for the rear wheels of the first and second sets of rear wheels on another side of the crane; and
   wherein the at least one controller is switchable between a travel mode and a crane mode, and when in the travel mode, the controller engages the mode in which the dampers of the front suspension system are connected to one another and the dampers of the rear suspension system for rear wheels of the first and second sets of rear wheels on one side of the crane are connected to both of the dampers for the rear wheels of the first and second sets of rear wheels on another side of the crane, and when in the crane mode, the at least one controller engages the mode in which all dampers act independently.

2. The pick and carry crane according to claim 1 wherein the at least one controller is adapted to alter a height of the front chassis and/or the rear chassis relative to a respective wheel by controlling the dampers.

3. The pick and carry crane according to claim 1 further comprising one or more incline sensors for measuring an incline of one or both of the front and rear chassis, wherein the at least one controller is adapted to alter a height of the front chassis and/or the rear chassis relative to a respective wheel in dependence on a measured incline.

4. The pick and carry crane according to claim 1 wherein the at least one controller is adapted to be switchable to a further tandem mode in which the third axle is moved to the crane mode and the dampers of all rear wheels of one side of the crane are connected to one another and the dampers of all rear wheels of another side of the crane are connected to one another.

5. The pick and carry crane according to claim 1 wherein the dampers are cylinders, each cylinder comprising a piston chamber and a shaft chamber.

6. The pick and carry crane according to claim 5 wherein when any two dampers are connected together, the piston chamber of a first cylinder is connected to the shaft chamber of a second cylinder.

7. The pick and carry crane according to claim 5 further comprising a first valve controllable to fluidly connect the piston chambers of the rear dampers of the rear wheels of the rear axle and third axle on one side of the crane to both of the shaft chambers of the rear dampers of the rear wheels of the rear axle and third axle on one side of the crane; and
   a first valve controllable to fluidly connect the shaft chambers of the rear dampers of the rear wheels of the rear axle and third axle on the one side of the crane to both of the piston chambers of the rear dampers of the rear wheels of the rear axle and third axle on the other side of the crane.

8. The pick and carry crane of claim 1, wherein the at least one controller is further adapted to, in the travel mode, connect the damper for a rear wheel of the rear axle on one side of the crane to both the damper of the rear wheel of the rear axle and the damper of the rear wheel of the third axle on the other side of the crane.

9. A method of controlling a suspension for a pick and carry crane, the pick and carry crane including a front chassis connected to two front wheels by a front suspension system, the two front wheels connected by a front axle, and a rear chassis connected to at least two rear wheels by a rear suspension system, the at least two rear wheels comprise a first set of rear wheels connected by a rear axle, and a second set of rear wheels connected by a third axle located rearward of the rear axle, wherein the front chassis is connected to the rear chassis to allow articulation between the front chassis and the rear chassis, the front suspension system includes hydraulic dampers configured to act between respective front wheels and the front chassis, the rear suspension system includes hydraulic dampers configured to act between respective rear wheels and the rear chassis, and wherein the method comprises:
   connecting the dampers of the front suspension system to one another and the dampers of the rear suspension system to one another;
   moving the third axle between a travel mode position where the second set of rear wheels engage a travelling surface and a crane mode position where the second set of rear wheels are lifted away from the travelling surface;
   alternating between two or more of the following modes:
      (i) all dampers fully extended;
      (ii) all dampers fully retracted;
      (iii) all dampers acting independently; and
      (iv) the dampers of the front suspension system being connected to one another and the dampers of the rear suspension system for rear wheels of the first and second sets of rear wheels on one side of the crane being connected to both of the dampers for the rear wheels of the first and second sets of rear wheels on the other side of the crane; and
   switching between a travel mode and a crane mode, wherein in the travel mode, the dampers of the front suspension system are connected to one another and the dampers for rear wheels of the first and second sets of rear wheels on one side of the crane are connected to both of the dampers for the rear wheels of the first and second sets of rear wheels on the other side of the crane, and in the crane mode, all dampers act independently.

10. The method according to claim 9 further comprising altering a height of the front chassis and/or the rear chassis relative to a respective wheel by controlling the dampers.

11. The method according to claim 9 wherein the crane further comprises one or more incline sensors for measuring an incline of one or both of the front and rear chassis, wherein the method further comprises altering a height of the front chassis and/or the rear chassis relative to a respective wheel in dependence on a measured incline.

12. The method according to claim 9 further comprising switching to a tandem mode in which the third axle is moved to the crane mode and the dampers of all rear wheels of one side of the crane are connected to one another and the dampers of all rear wheels of another side of the crane are connected to one another.

13. The method according to claim 9 wherein the dampers are cylinders, each cylinder comprising a piston chamber and a shaft chamber.

14. The method according to claim 13 wherein connecting any two dampers comprises connecting the piston chamber of a first cylinder to the shaft chamber of a second cylinder.

15. The method according to claim 13 further comprising controlling a first valve to fluidly connect the piston chambers of the dampers of the first and second sets of rear wheels on one side of the crane to both of the shaft chambers of the dampers of the rear wheels of the first and second sets of rear wheels on the other side of the crane.

16. The method according to claim 15 further comprising controlling a second valve to fluidly connect the shaft chambers of the dampers of the first and second sets of rear wheels on the one side of the crane to both of the piston chambers of the dampers of the rear wheels of the first and second sets of rear wheels on the other side of the crane.

17. The method of claim 9 further comprising, in the travel mode, connecting the damper for a rear wheel of the rear axle on one side of the crane to both the damper of the rear wheel of the rear axle and the damper of the rear wheel of the third axle on the other side of the crane.

18. A crane comprising a front chassis connected to at least two front wheels by a front hydraulic suspension system and a rear chassis connected to a first set of rear wheels and a second set of rear wheels by a rear hydraulic suspension system, the first set of rear wheels connected by a rear axle, and the second set of rear wheels connected by a third axle rearward of the rear axle, wherein
   the front hydraulic suspension system includes hydraulic dampers configured to act between respective front wheels and the front chassis;
   the rear hydraulic suspension system includes hydraulic dampers configured to act between respective rear wheels and the rear chassis; and wherein
   the crane further comprises at least one controller for selectively connecting the dampers of the front hydraulic suspension system to one another and the dampers of the rear hydraulic suspension system to one another; and
   wherein the controller is adapted to control the dampers such that (i) all act independently, and (ii) the dampers of the front suspension system are connected to one another and the dampers of the rear suspension system for rear wheels of the first and second sets of rear wheels on one side of the crane are connected to both of the dampers for the rear wheels of the first and second sets of rear wheels on another side of the crane.

19. The crane according to claim 18 wherein the front chassis is connected to the rear chassis to allow articulation between the front chassis and the rear chassis.

20. The crane according to claim 18 which is a pick and carry crane.

21. The crane according to claim 18 wherein the third axle is moveable between a crane mode position where the second set of rear wheels is engageable with a travelling surface and a travel mode position where the second set of rear wheels is lifted away from the travelling surface; and
   wherein the at least one controller is switchable between a travel mode and a crane mode, and when in the travel mode, the controller engages the mode in which the dampers of the front suspension system are connected to one another and the dampers of the rear suspension system for rear wheels of the first and second sets of rear wheels on one side of the crane are connected to both of the dampers for the rear wheels of the first and second sets of rear wheels on another side of the crane, and when in the crane mode, the at least one controller engages the mode in which all dampers act independently.

* * * * *

UNITED STATES PATENT AND TRADEMARK OFFICE
CERTIFICATE OF CORRECTION

| | | |
|---|---|---|
| PATENT NO. | : 11,440,369 B2 | Page 1 of 2 |
| APPLICATION NO. | : 17/286229 | |
| DATED | : September 13, 2022 | |
| INVENTOR(S) | : McPherson | |

It is certified that error appears in the above-identified patent and that said Letters Patent is hereby corrected as shown below:

In the Claims

Column 12, Line 25, Claim 1:
After "wherein the third axle is moveable between a"
Delete "crane" and
Insert -- travel --.

Column 12, Lines 26-27, Claim 1:
After "engageable with a travelling surface and a"
Delete "travel" and
Insert -- crane --.

Column 12, Line 67, to Column 13, Line 1, Claim 4:
After "in which the third axle is"
Delete "moved to the crane mode" and
Insert -- lowered --.

Column 14, Lines 16-17, Claim 12:
After "in which the third axle is"
Delete "moved to the crane mode" and
Insert -- lowered --.

Column 15, Line 9, Claim 21:
After "is moveable between a"
Delete "crane" and
Insert -- travel --.

Signed and Sealed this
Twenty-fifth Day of February, 2025

Coke Morgan Stewart
*Acting Director of the United States Patent and Trademark Office*

Column 15, Lines 10-11, Claim 21:
After "engageable with a travelling surface and a"
Delete "travel" and
Insert -- crane --.